United States Patent [19]
Sudo et al.

[11] Patent Number: 5,465,754
[45] Date of Patent: Nov. 14, 1995

[54] VALVE ARRANGEMENT

[75] Inventors: Kiyoshi Sudo, Tokyo; Masakazu Ookubo, Saitama, both of Japan

[73] Assignees: Showa Tansan Co., Ltd., Tokyo; Daito Valve Seisakusho Co., Ltd., Saitama, both of Japan

[21] Appl. No.: 335,534

[22] Filed: Nov. 7, 1994

[30] Foreign Application Priority Data

May 11, 1994 [JP] Japan .................. 6-121740

[51] Int. Cl.$^6$ .................................... F16L 37/28
[52] U.S. Cl. .................. 137/614.2; 137/614.11; 137/614.19; 137/614.21; 251/149.5
[58] Field of Search ................. 137/614.2, 322, 137/614.19, 614.11, 614.21; 251/149.5, 149.6; 141/18

[56] References Cited

U.S. PATENT DOCUMENTS

| | | | |
|---|---|---|---|
| 2,620,817 | 12/1952 | Blaydes | 137/322 |
| 2,890,718 | 6/1959 | Smith | 137/614.2 |
| 2,905,487 | 9/1959 | Schifter | 137/614.21 |
| 3,285,298 | 11/1966 | Gellman | 137/614.2 |
| 4,210,168 | 7/1980 | Yonezawa | 137/614.2 |
| 4,844,123 | 7/1989 | Wick | 137/614.2 |
| 4,960,261 | 10/1990 | Scott et al. | 137/322 |
| 5,127,436 | 7/1992 | Campion et al. | 137/614.2 |

Primary Examiner—A. Michael Chambers
Attorney, Agent, or Firm—Jordan and Hamburg

[57] ABSTRACT

The main valve slides in the direction for its opening when the plunger is pushed in. This causes the nozzle hole and the main valve's operating bore to be communicated, which then causes the compressed gas in a pressure vessel to open the follower valve's check valve thus discharging the gas to the outside of the pressure vessel through the follower valve's communicating bore. When the pressure at the discharge side exceeds the pressure of the pressure vessel during such discharge, a back-flow pressure causes the follower valve to slide, thus closing the follower valve's operating bore and the communicating bore with the check valve. This closes the gas's passage and prevents its backflow into the pressure vessel. When charging a high-pressure gas, any moisture which has penetrated into the nozzle hole and/or the main valve's operating bore can be blown off by discharging residual pressure in the pressure vessel.

3 Claims, 15 Drawing Sheets

5,465,754

VALVE ARRANGEMENT

BACKGROUND OF THE INVENTION

The present invention relates to a valve arrangement, which is attached to the mouth tap of a pressure vessel containing compressed gas such as nitrogen or carbon dioxide, and is capable of charging and discharging such compressed gas.

A conventional valve arrangement of this kind comprises, as shown in FIG. 17, a valve body B sealed to a mouth tap A of a pressure vessel, a large-diameter valve operating bore C which is formed on said valve body B and which communicates with the inside of said pressure vessel, a small-diameter nozzle hole D formed on said valve body B which communicates said valve operating bore C with the outside, a valve member F which is seated on the inner-most valve seat E of said valve operating bore C, and which closes said nozzle hole D, a plunger G which protrudes from the end of said nozzle hole D and is capable of sliding into said nozzle hole D which is attached to said valve member F, and a pressure-exerting spring H fitted within said valve operating bore C to apply constant pressure upon said valve member F so that it will always sit on said valve seat E.

In conventional valve arrangements constructed as described above, unless the gap between the plunger G and the nozzle hole D is small, the valve member F will wobble, preventing it from being firmly seated on the valve seat E and thus preventing tight sealing.

On the other hand, a small gap between the plunger G and the nozzle hole D reduces the efficiency of gas charging since the gas flows through said gap, causing the gas charging operation to take a longer time.

Furthermore, if the pressure at the consuming side exceeds that in the pressure vessel, the valve member F will open against the pressure caused by the pressure-exerting spring H. It will allow the gas's back-flow, causing liquids and the like other than gas, to be introduced into the pressure vessel.

SUMMARY OF THE INVENTION

In view of the disadvantages as described above, it is an object of the present invention to provide a valve arrangement which enables efficient charging of high-pressure gases while great certainly in the opening and closing of the nozzle hole, and efficiently preventing a back-flow of any liquids and the like into the pressure vessel.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF THE PREFERRED EMBODIMENTS

Figure 1:
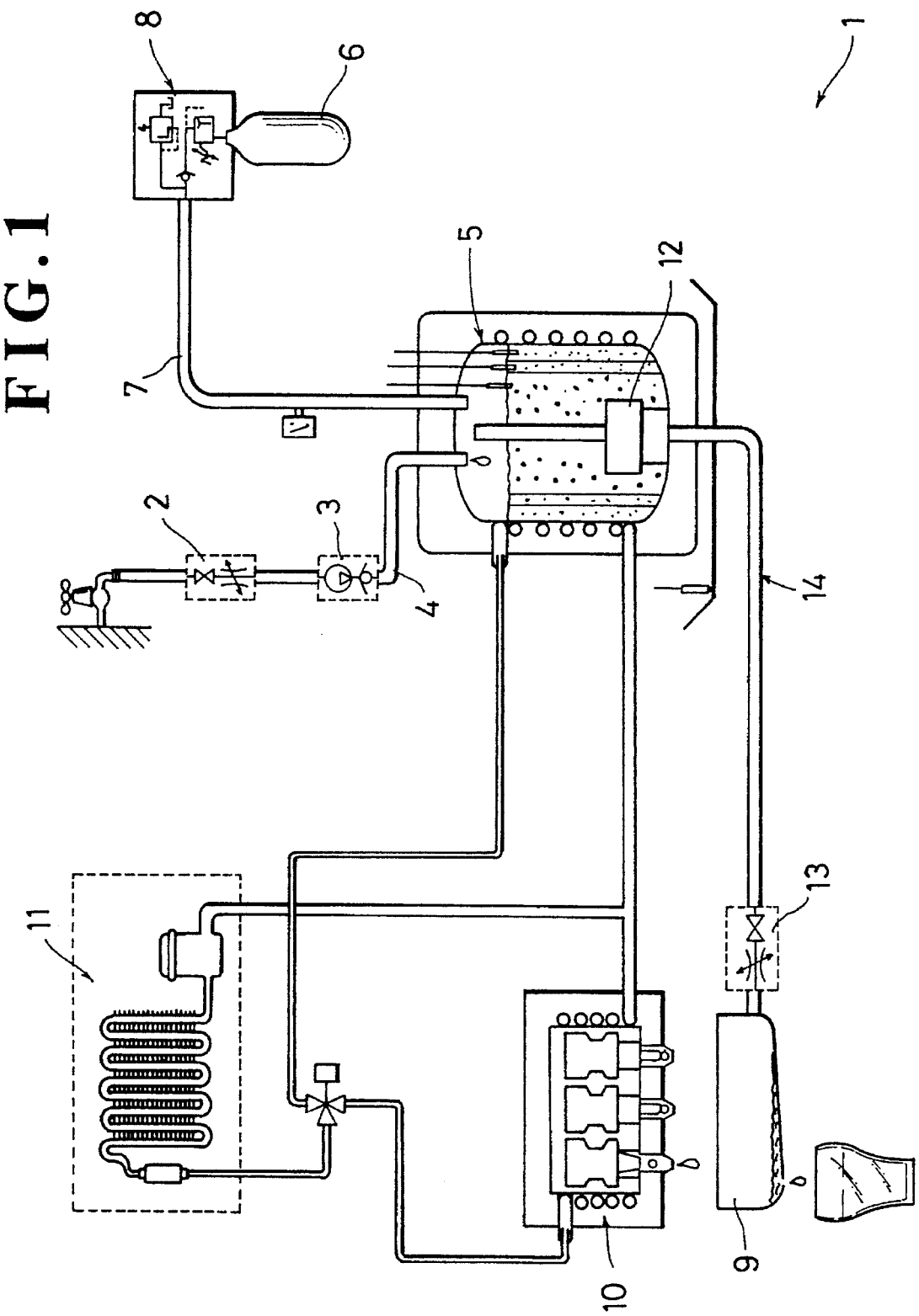
FIG. 1 is an explanatory drawing showing the state of use in the first preferred embodiment of the invention.

Referring now to the preferred embodiments shown in the drawings, the present invention is explained in detail.

In the first preferred embodiment of the invention shown in FIG. 1 to FIG. 12, the reference numeral 1 denotes a soft drink production device, and said soft drink production device comprises, as shown in FIG. 1, a carbonated water producing container 5 which communicates with a tap water pipe 4 through an electromagnetic valve 2 and a pump 3, a carbonic acid gas feeder 8 which supplies carbonic acid gas into a carbonated water producing container 5 from a pressure vessel 6 charged with carbonic acid gas, through a supply passage 7, a concentrated juice feeder 10 which is capable of feeding a predetermined amount of concentrated juice into a mixing chamber 9, a cooling device 11 which cools the concentrated Juice feeder 10 and said carbonated water producing container 5, and a carbonated water feeder 14 which supplies carbonated water within said carbonated water producing container 5 to said mixing chamber 9 through a pump 12 and an electromagnetic valve 13.

Figure 2:
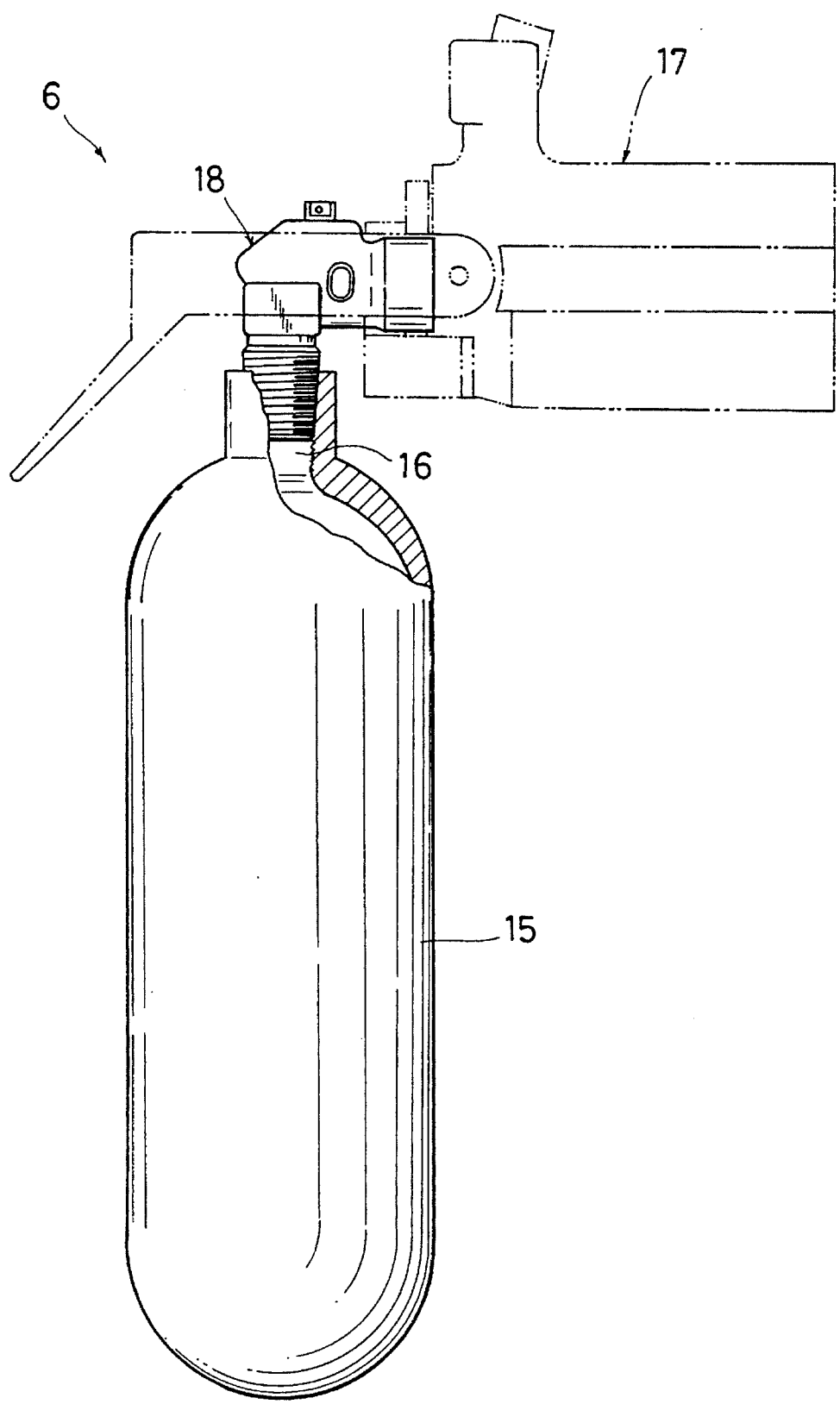
FIG. 2 is an explanatory drawing of the pressure vessel using the first preferred embodiment of the invention.
Figure 3:
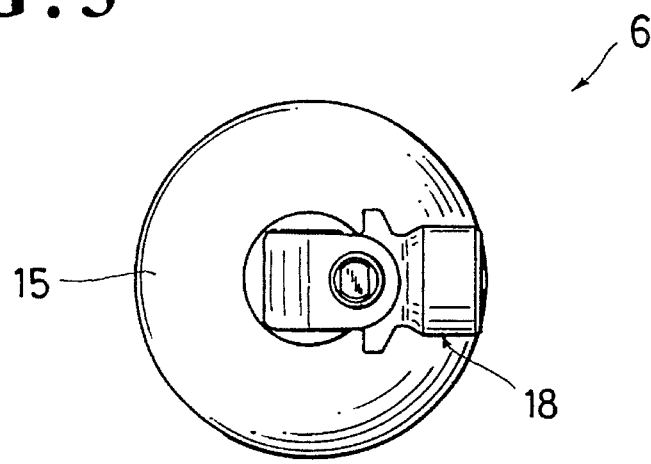
FIG. 3 is a plan view of the pressure vessel in FIG. 2.
Figure 4:
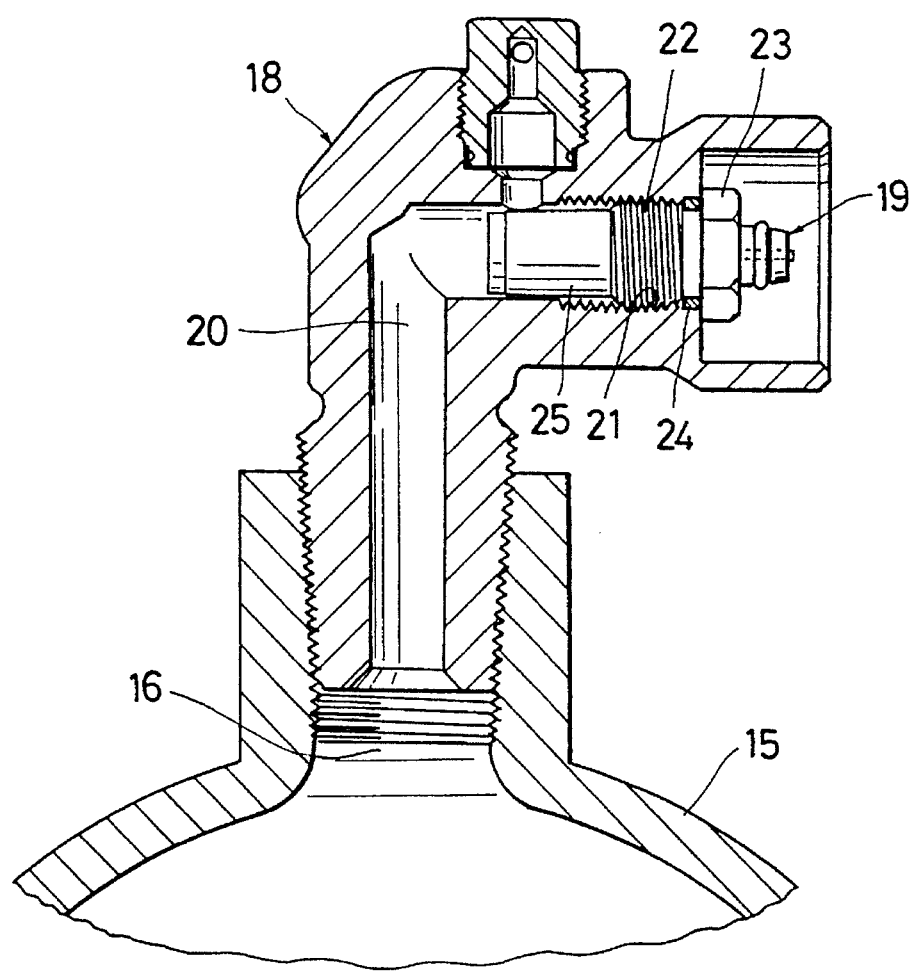
FIG. 4 is a cross-sectional view of the pressure vessel in FIG. 2 with the main parts enlarged.

Said pressure vessel 6 charged with carbonic acid gas is composed of, as shown in FIG. 2 to FIG. 4, a pressure vessel body 15 into which carbonic acid gas is filled, a mouth tap 18 which is screwed in and attached at an opening port 16 of said pressure vessel body 15 and is connected with a fitting metal 17 of said carbonic acid gas feeder 8 and a valve arrangement 19 attached to the mouth tap 18.

Figure 5:
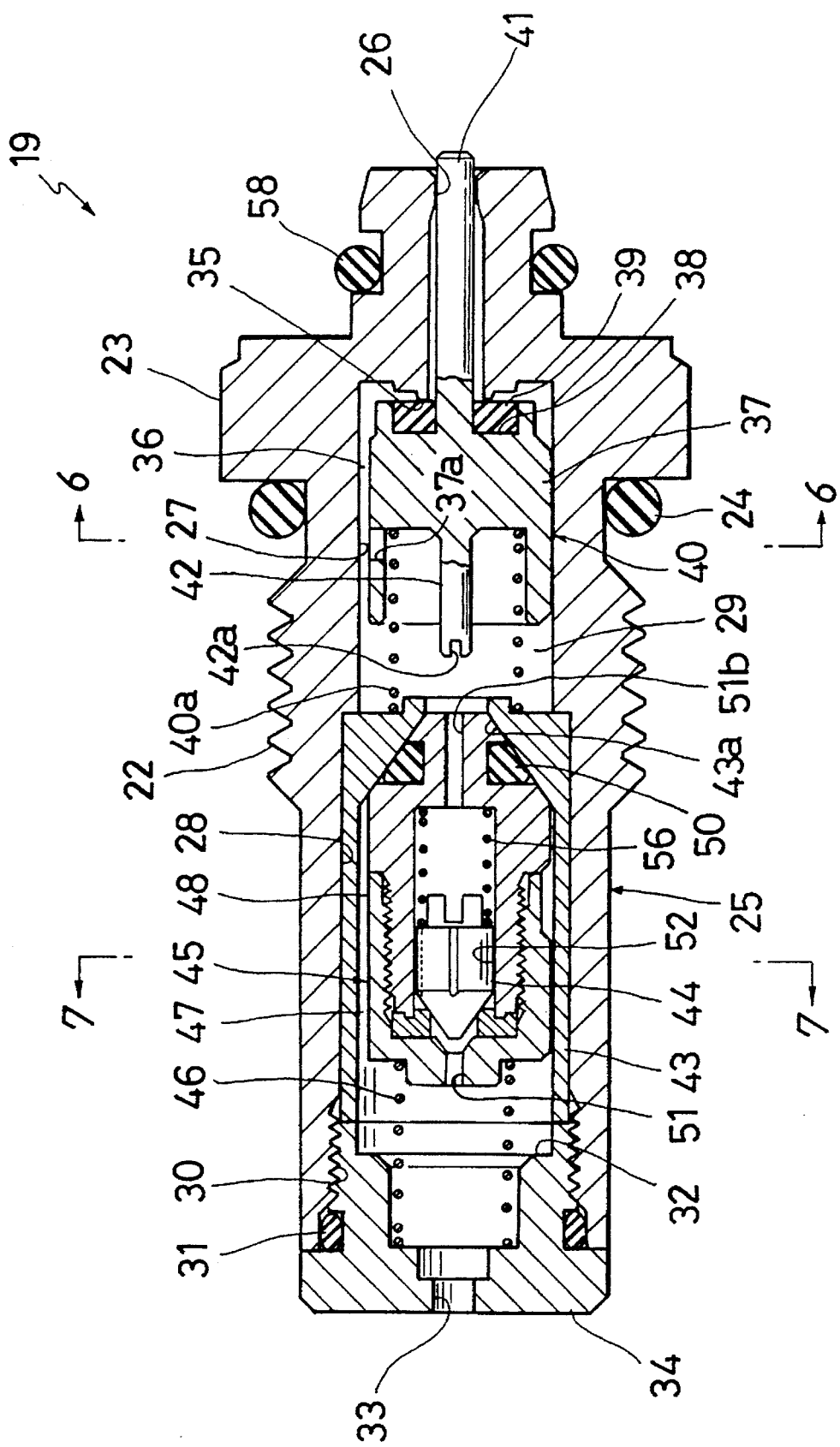
FIG. 5 is a cross-sectional view showing the first preferred embodiment of the invention.
Figure 6:
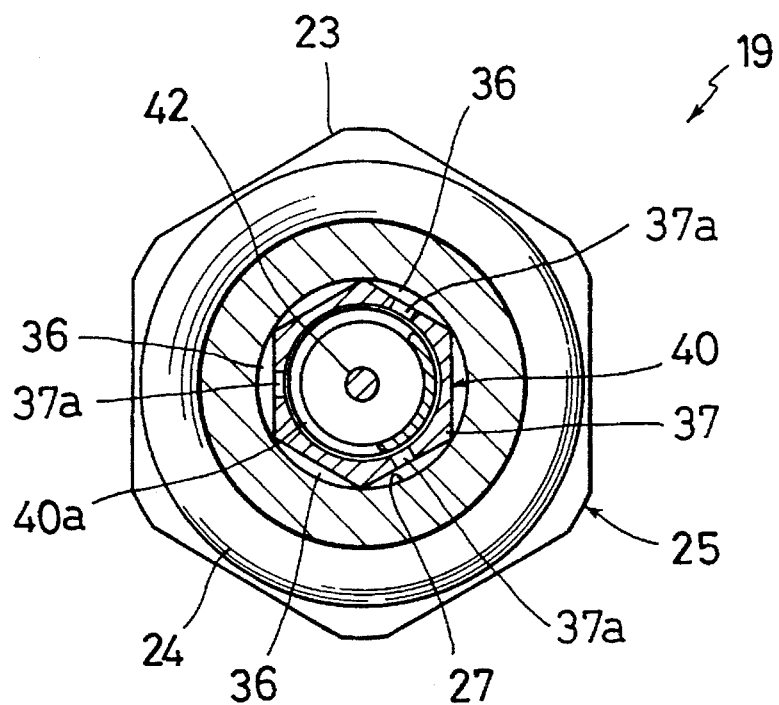
FIG. 6 is a cross-sectional view along Line 6—6 of FIG. 5.
Figure 7:
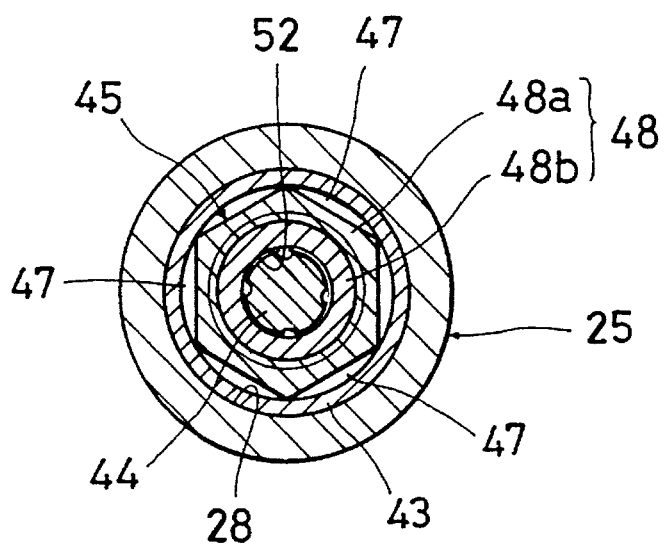
FIG. 7 is a cross-sectional view along Line 7—7 of FIG. 5.

Said valve arrangement 19 comprises, as shown in FIG. 5 to FIG. 7, a valve body 25 attached at the mouth tap 18 via an O-ring 24 and provided with a thread 22 screwed into a thread 21 formed at a passage 20 of said mouth tap 18 and with a polygonal flange 23 engaged with a fastening metal tool such as a box wrench; a passage 29 composed of a nozzle hole 26 of which end of the outer side is smaller in diameter but the portion except said end is larger in diameter, a main valve operating bore 27 communicating with said nozzle hole 26 and having a larger diameter than said nozzle hole 26 and a follower valve operating bore 28 communicating with said main valve operatig bore 27 formed in the valve body 25; a follower valve seat 32 screwed in and fixed to through a thread 30 formed at the rear end of the follower valve operating bore 28 of said valve body 25 and O-ring 31, and a fitting metal 34 provided with a pass hole 33 communicating with a passage 20 of said mouth tap 18 formed at a neary central position; a main valve body 37 which can slide within said main valve operating bore 27 and is adapted to be brought in contact with a valve seat 35 at the end of said nozzle hole 26, and which can poen or close said nozzle hole 26, and which is provided with a plurality of gap 36 at the outer periphery and with a pass hole 37a communicating with said gap 36; a main valve 40 with synthetic resin sheet materials pressed into or rubber materials 39 attached by way of baking in a concave area 38 formed at the region where said main valve body 37 comes into contact with said valve seat 35; a plunger 41 which is integrated at the nearly central front face of said main valve 40 and can be slid within said nozzle hole 26, with the end of said plunger projected outward further than the end of the nozzle hole 26 when the nozzle hole 26 is closed by said main valve 40; a check valve operating rod 42 secured to almost the center of the rear face of said main valve 40 so as to be extended backward, having a cutout groove 42a at the end; a pressure-exerting spring 40a which applies forces to said main valve 40 so that said nozzle hole 26 may be closed all the time; a follower valve support cylinder 43 fitted into and fixed at said follower valve operating bore 28, and provided with a follower valve seat 43a at the part near said main valve operating bore 27; and a follower valve 45 which can slide within said follower valve support cylinder 43, including a check valve 44 therein and is pressed by a pressure-exerting spring 46 so that it may be in contact with said follower valve seat 43a all the time.

Said follower valve 45 is designed not to contact the follower valve seat 32 in a normal state of use, by the resilient force of said pressure-exerting spring 46. However, if required, said follower valve 45 may be arranged in a different way that the pass hole 33 still can communicate within said follower valve cylinder 43, even when said follower valve 45 contacts the follower valve seat 32.

Figure 8:
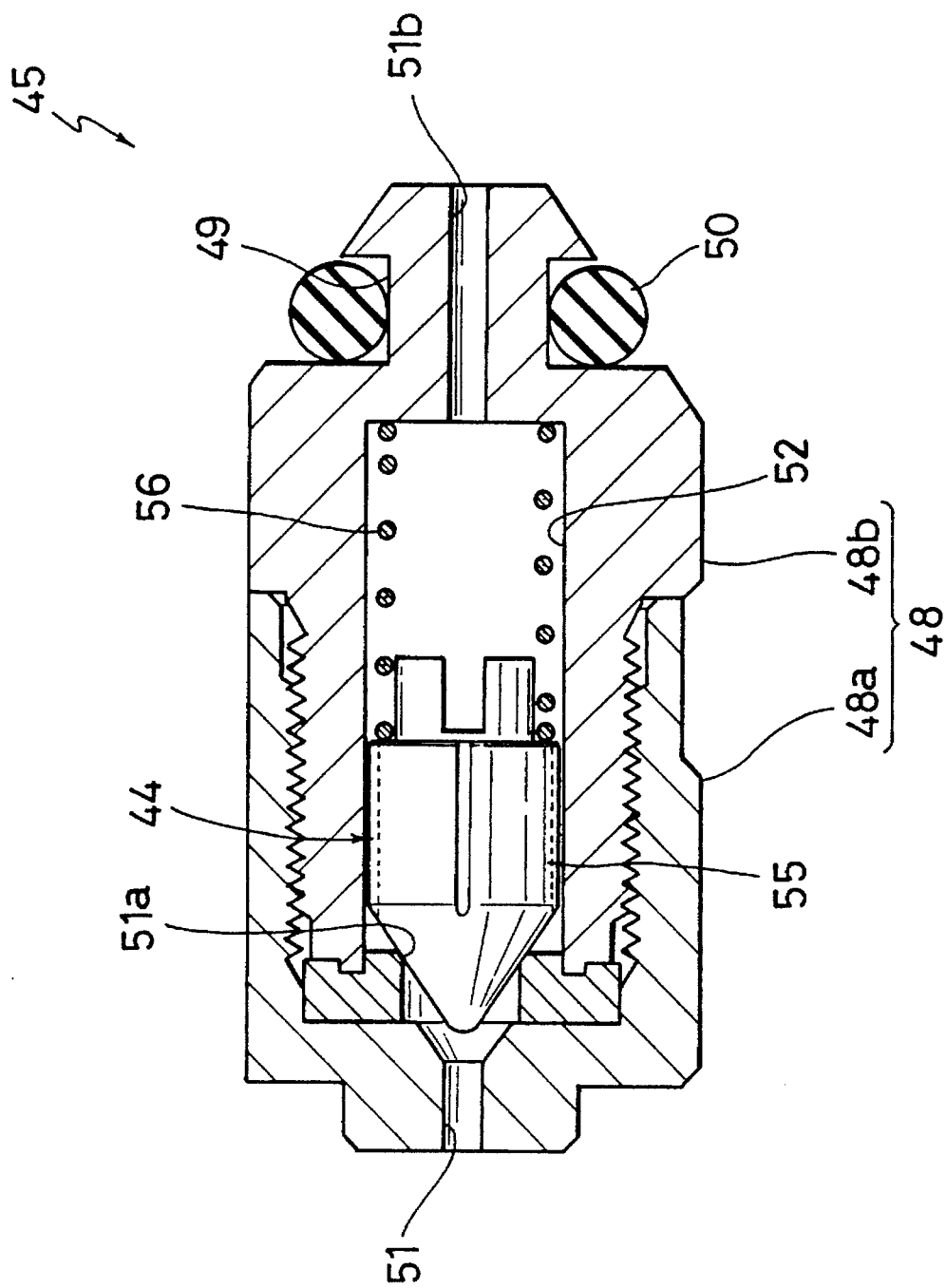
FIG. 8 is an explanatory drawing of a follower valve.

Said follower valve 45 comprises, as shown in FIG. 8, a follower valve main body 48 with the left follower valve component 48a and the right follower valve component 48b screwed and fixed to each other, where an end of said left follower valve component 48a contacts the follower valve seat 32 of said fitting metal 34, while an end of said right follower valve component 48b comes into contact with the follower valve seat 43a of said follower valve support cylinder 43, a plurality of gap 47 which is formed at the outer periphery of the left follower valve component 48a and the right follower valve component 48b of said follower valve body 48, and which communicates with the pass hole 33 of said fitting metal 34 and with said main valve operating bore 27, a small-diameter communicating bore 51 formed almost in the center of the part of said left follower valve component 48a, a check valve seat 51a formed at the inner side face of said communicating bore 51, a check valve inserting bore 52 formed at the central part of said right follower valve component 48b and communicating with said communicating bore 51, a small-diameter communicating bore 51b which communicates with said check valve inserting bore 52 and with said main valve operating bore 27, an O-ring 50 for sealing which is accommodated in the concave area 49 formed at the end where said right follower valve component 48b contacts the follower valve seat 43a of said follower valve support cylinder 43, and a check valve body 55 which is in contact with said check valve seat 51a all the time by a pressure-exerting spring 56 within said check valve inserting bore 52, by which said check valve inserting bore 52 is closed and the residual pressure within said pressure vessel 6 is retained.

Figure 9:
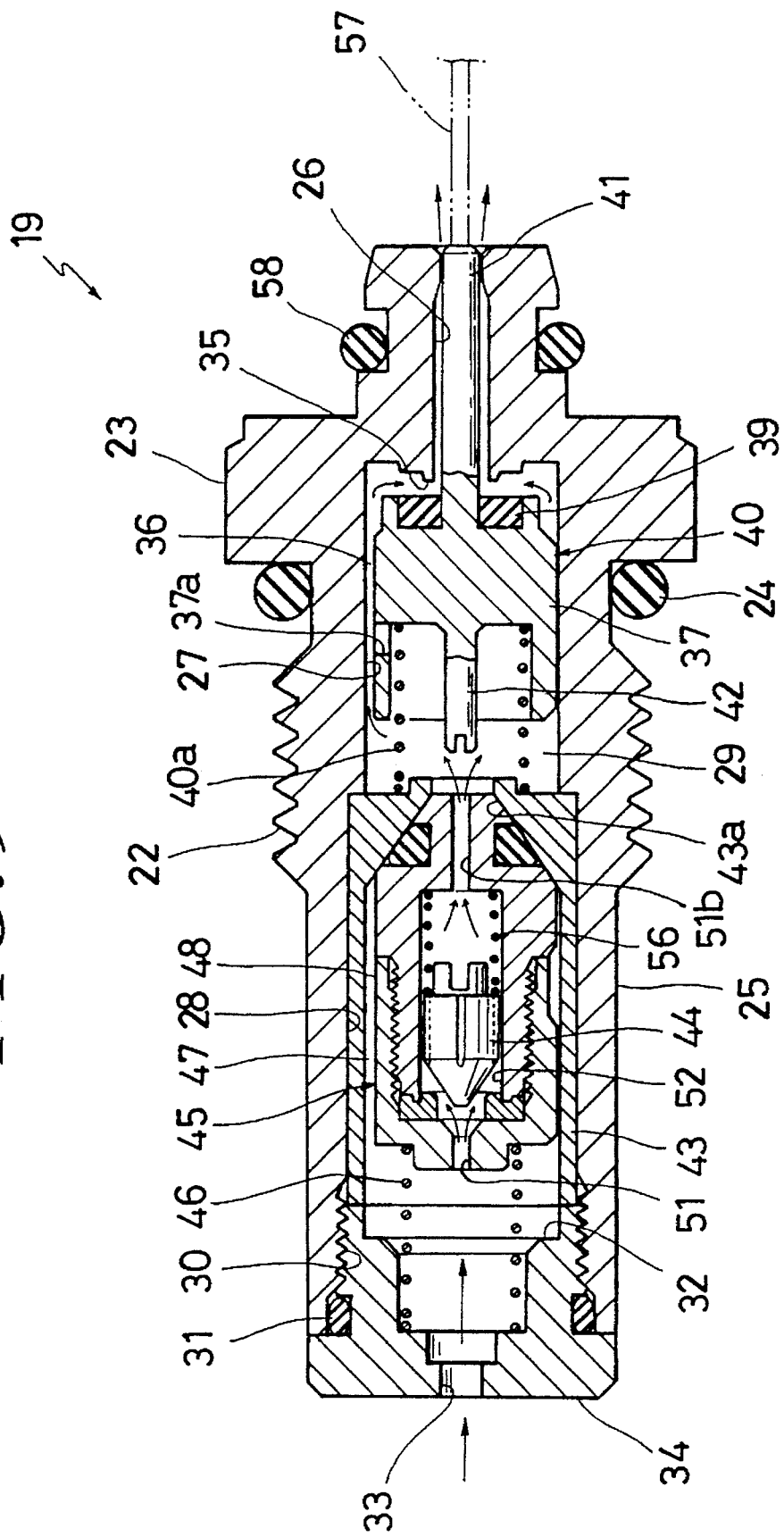
FIG. 9 is an explanatory drawing showing the state of discharging gas to the outside in the first preferred embodiment of the invention.

In the valve arrangement 19, as shown in FIG. 9, as constructed above, the mouth tap 18 of the pressure vessel 6 is connected by the fitting metal 17 of the carbonic acid gas feeder 8 ,by which a plunger 41 is pushed inside by the plunger operating rod 57 and the nozzle hole 26 and the main valve operating bore 27 are communicated.

Thus the check valve 44 is opened by the pressure of carbonic acid gas within the pressure vessel 6, and the gas is discharged through the pass hole 33 of the fitting metal 34, the follower valve operating bore 28, the communicating bore 51 of the follower valve 45, the check valve inserting bore 52 ,the communicating bore 51b, the main valve operating bore 27, the gap 36 and the nozzle hole 26.

Figure 10:
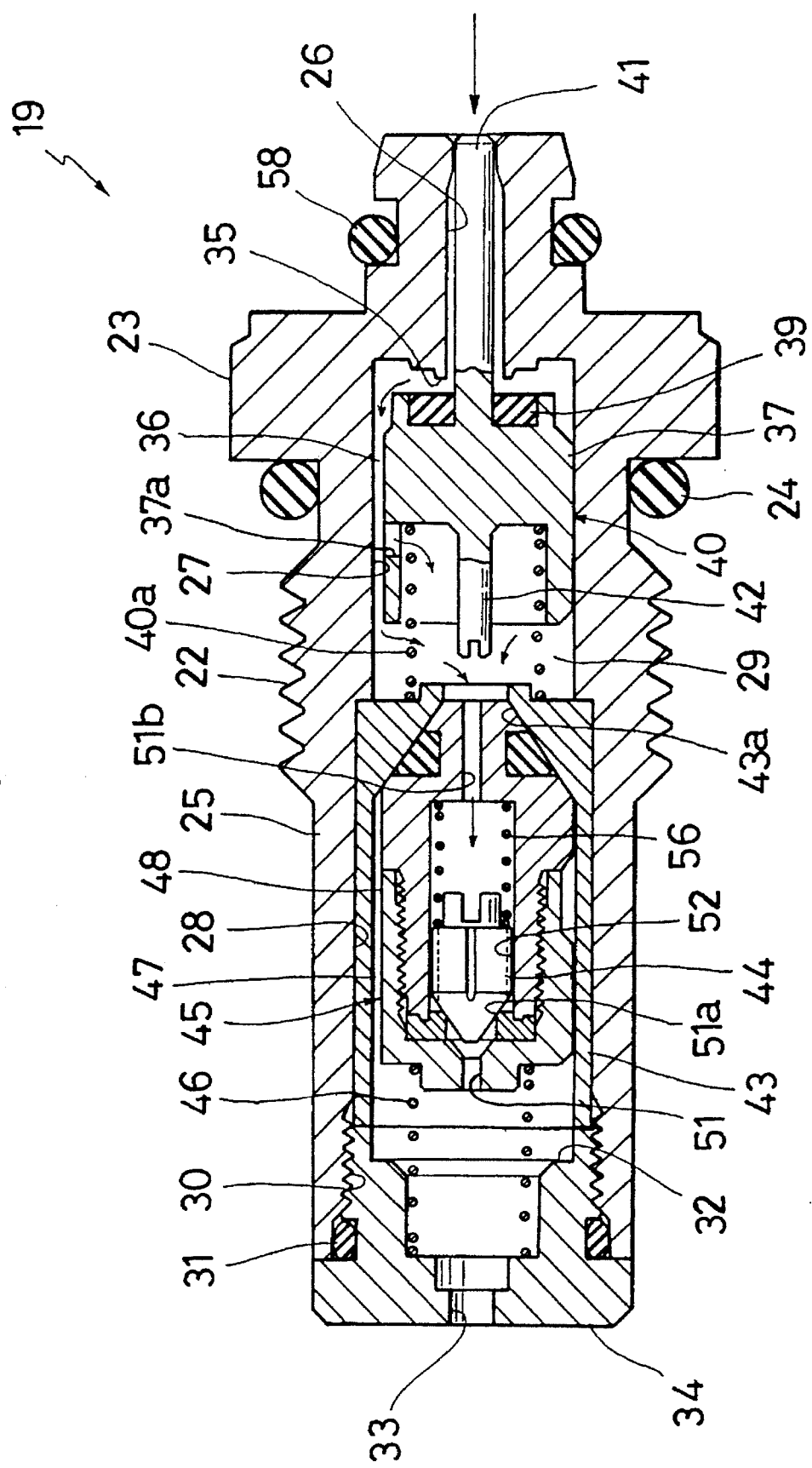
FIG. 10 is an explanatory drawing showing the state of preventing a back-flow in the first preferred embodiment of the invention.

When the internal pressure within the pressure vessel 6 decreases, and a relatively lower pressure in the supply line 7 of the carbonic acid gas feeder 8 becomes higher, as shown in FIG. 10, the gas will flow back into the main valve operating bore 27 as the main valve 40 is opened, while the follower valve 45 will close the follower valve operating bore 28 by said pressure, and the check valve 44 is brought into contact with the check valve seat 51a to close the communicating bore 51. Thus, a back-flow of carbonated water into the pressure vessel 6 can be prevented.

Figure 11:
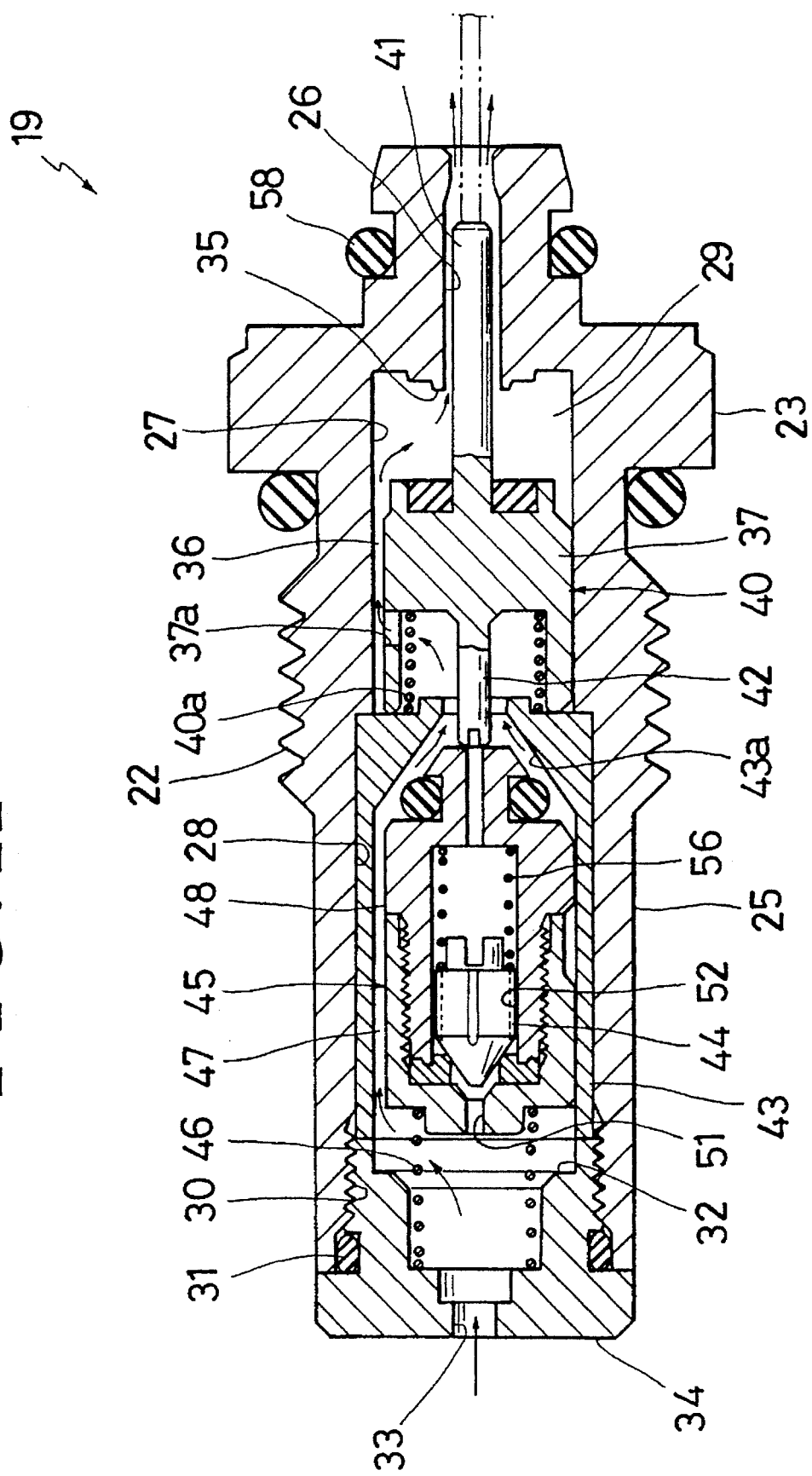
FIG. 11 is an explanatory drawing showing a blowing state in the first preferred embodiment of the invention.

When the carbonic acid gas is charged into the pressure vessel 6, as shown in FIG. 11, the plunger 41 is pushed in, causing the main valve 40 to move in the same direction to open, then the follower valve 45 is slid by the check valve operating rod 42 against the force of the pressure-exerting spring 46 to open a plurality of the gap 47 of the follower valve 45, whereby the carbonated water which has penetrated into the nozzle hole 26 and the main valve operating bore 27 is blown off by the residual pressure in the pressure vessel 6.

Figure 12:
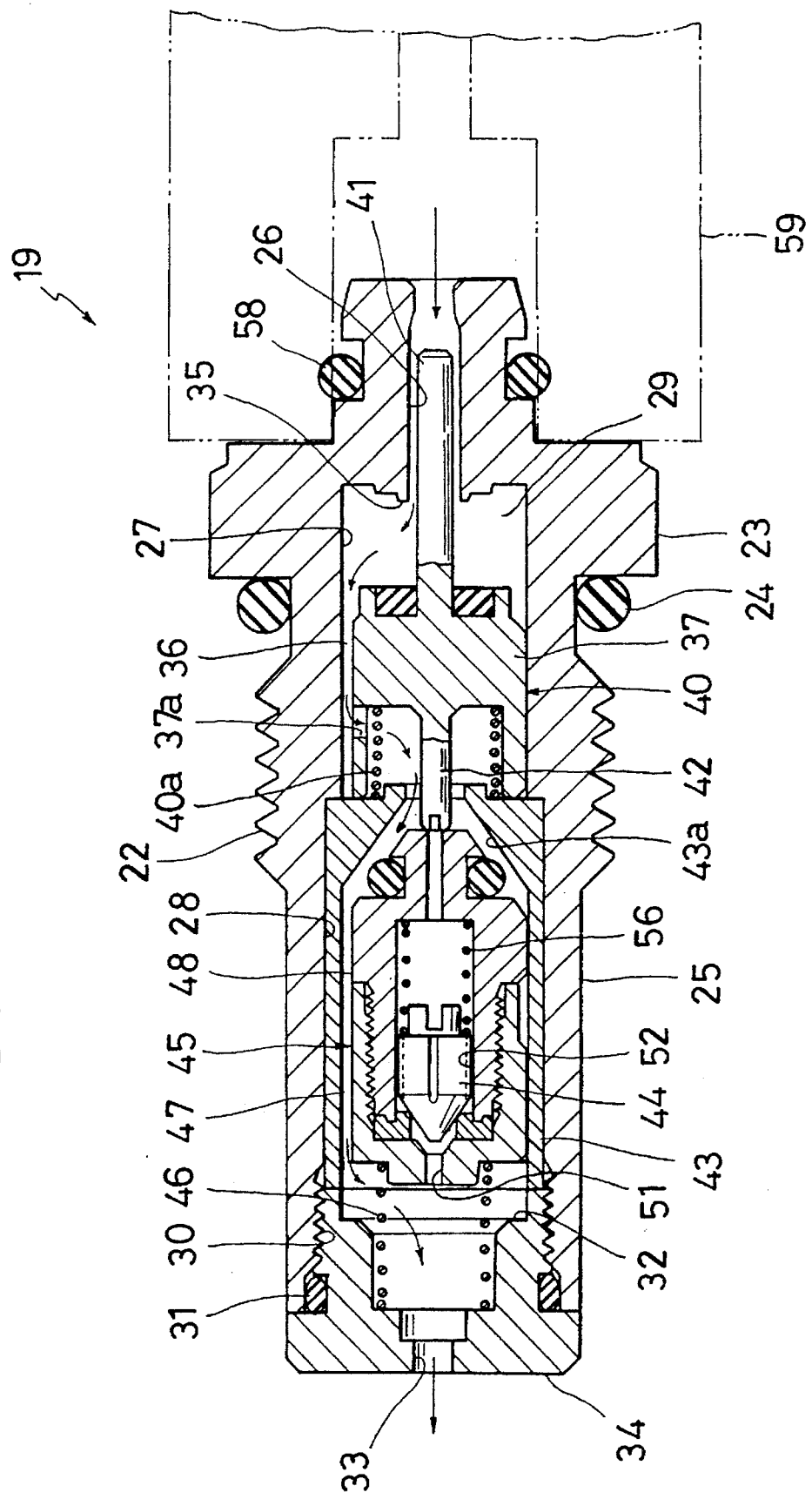
FIG. 12 is an explanatory drawing showing a gas charging state in the first preferred embodiment of the invention.

After that, as shown in FIG. 12, high pressure carbonic acid gas is supplied to the valve arrangement 19 of the pressure vessel 6, after blowing off of any liquid, with a carbonic acid gas feeding hose 59 connected via an O-ring 58. This causes the end of the plunger 41 to be pushed into the larger diameter area of the nozzle hole 26, and the main valve 40 will move in a similar manner, then the follower valve 45 is caused to move against the force of the pressure-exerting spring 46.

This opens the nozzle hole 26, and the gas is charged into the pressure vessel 6 through a plurality of the gap 36 of the main valve 40, the follower valve operating bore 28, a plurality of the gap 47 of the follower valve 45 and the pass hole 33 of the fitting metal 34.

If the mouth tap 18 of the pressure vessel 6 is not connected to the carbonic acid gas feeder 8, as shown in FIG. 5, the main valve 40 is pressed in a closing direction by a pressure-exerting spring 40a and so the gas within the pressure vessel 6 will not be discharged.

DIFFERENT PREFERRED EMBODIMENTS OF THE INVENTION

Referring now to FIG. 13 to 16, different preferred embodiments of the invention are explained as follows. In giving the explanation of these different preferred embodiments of the invention, the same construction as the said first preferred embodiment of the invention is marked with the same numerals to save repeated explanation.

Figure 13:
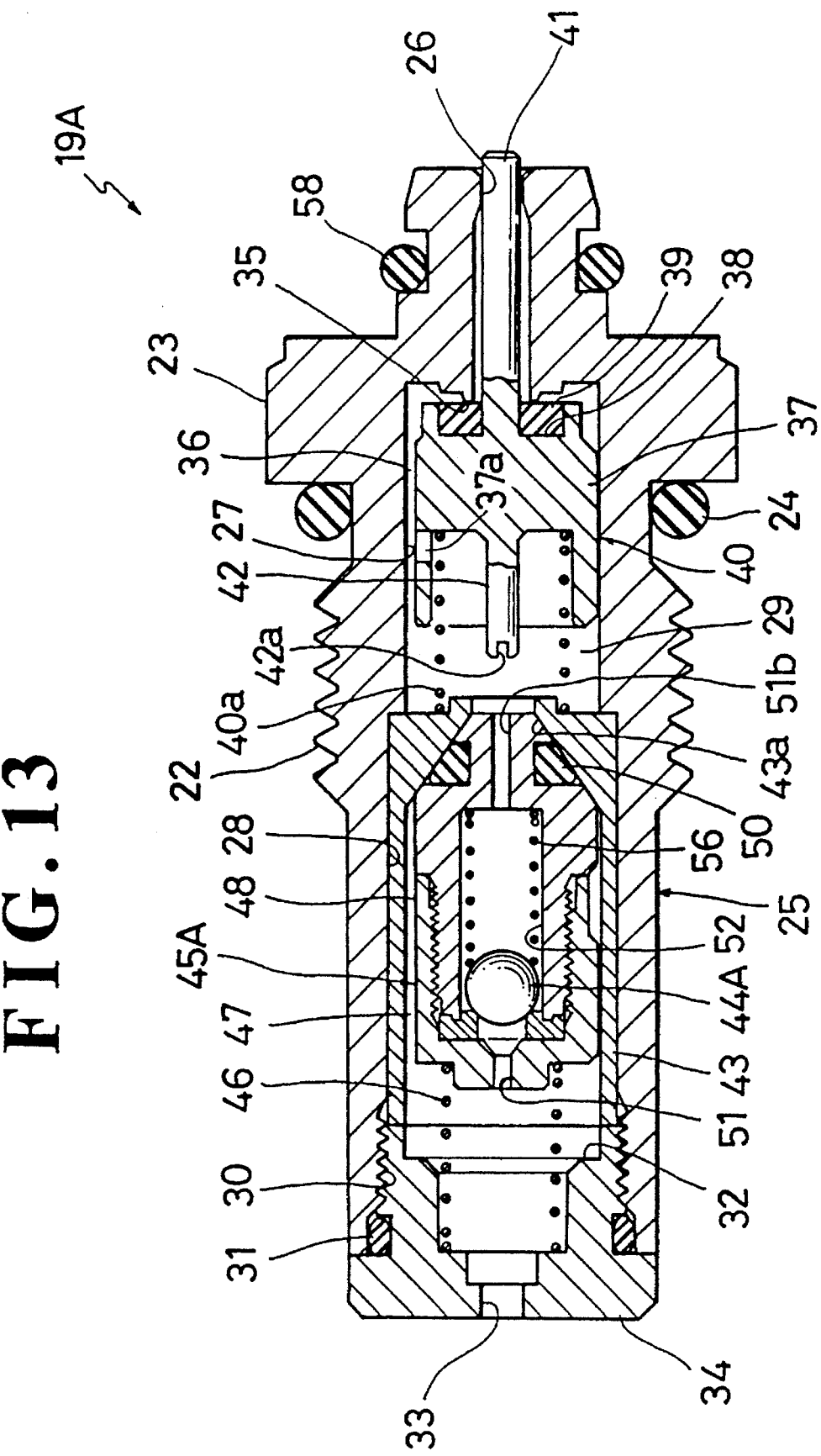
FIG. 13 is a cross-sectional view showing the second preferred embodiment of the invention.
Figure 14:
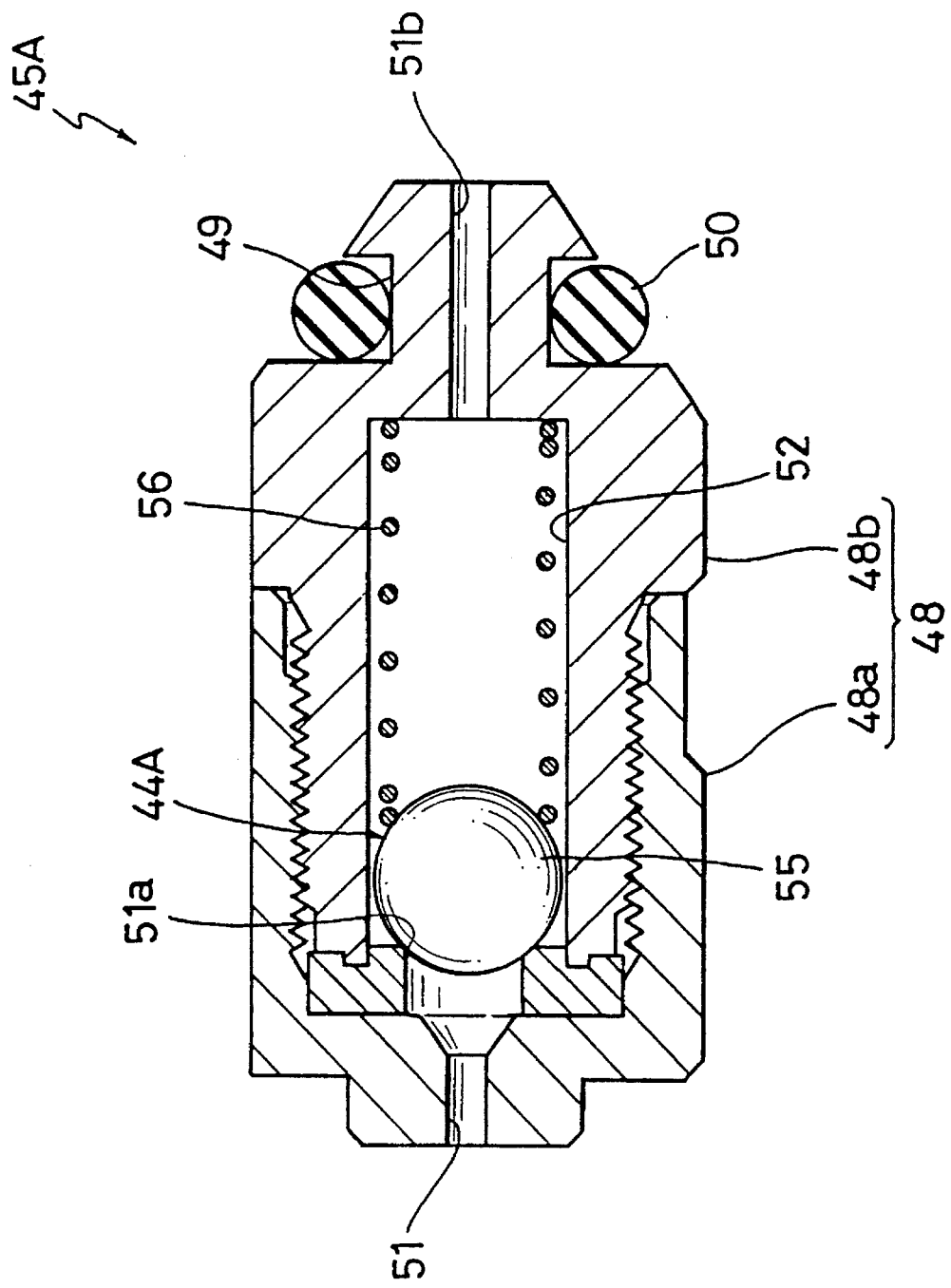
FIG. 14 is an explanatory drawing of a follower valve in the second preferred embodiment of the invention.

In the second preferred embodiment of the invention shown in FIG. 13 and FIG. 14, the major difference from said first preferred embodiment of the invention is that a follower valve 45A using a check valve 44A employing a ball valve is used. In the valve arrangement 19A using the follower valve 45A formed as above, similar functions and advantages to those in the first preferred embodiment of the invention are obtained.

Figure 15:
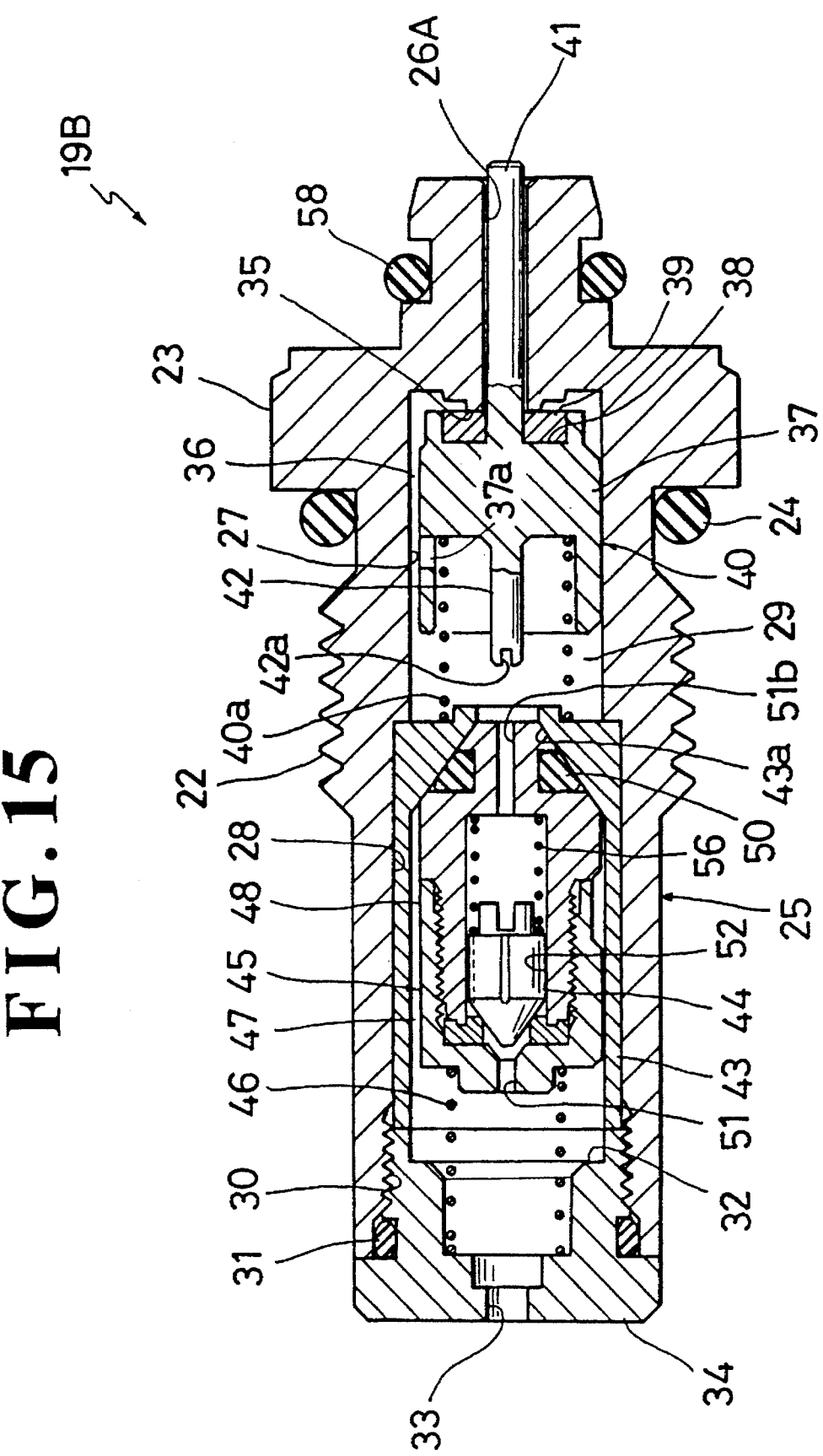
FIG. 15 is a cross-sectional view showing the third preferred embodiment of the invention.
Figure 16:
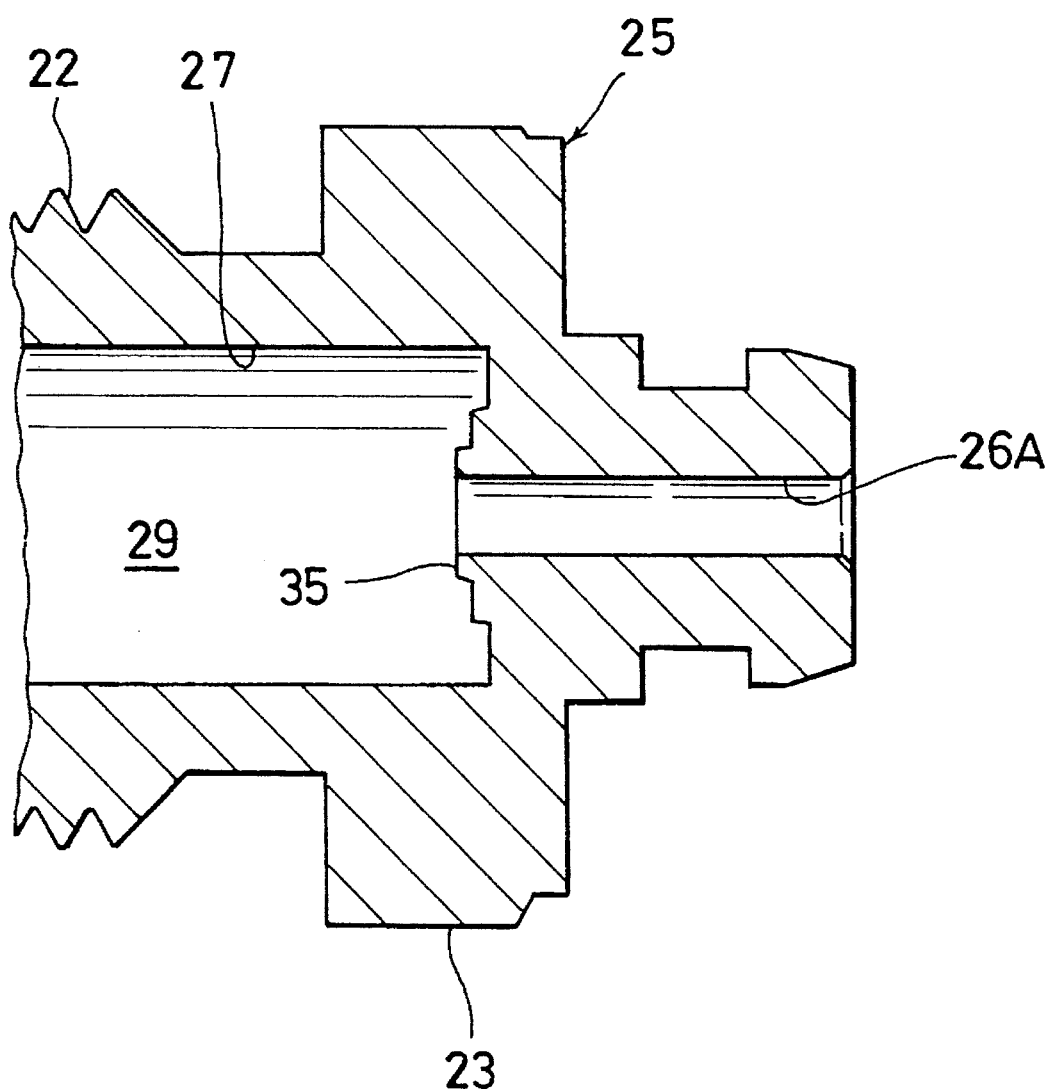
FIG. 16 is an enlarged view of main part in the third preferred embodiment of the invention.
Figure 17:
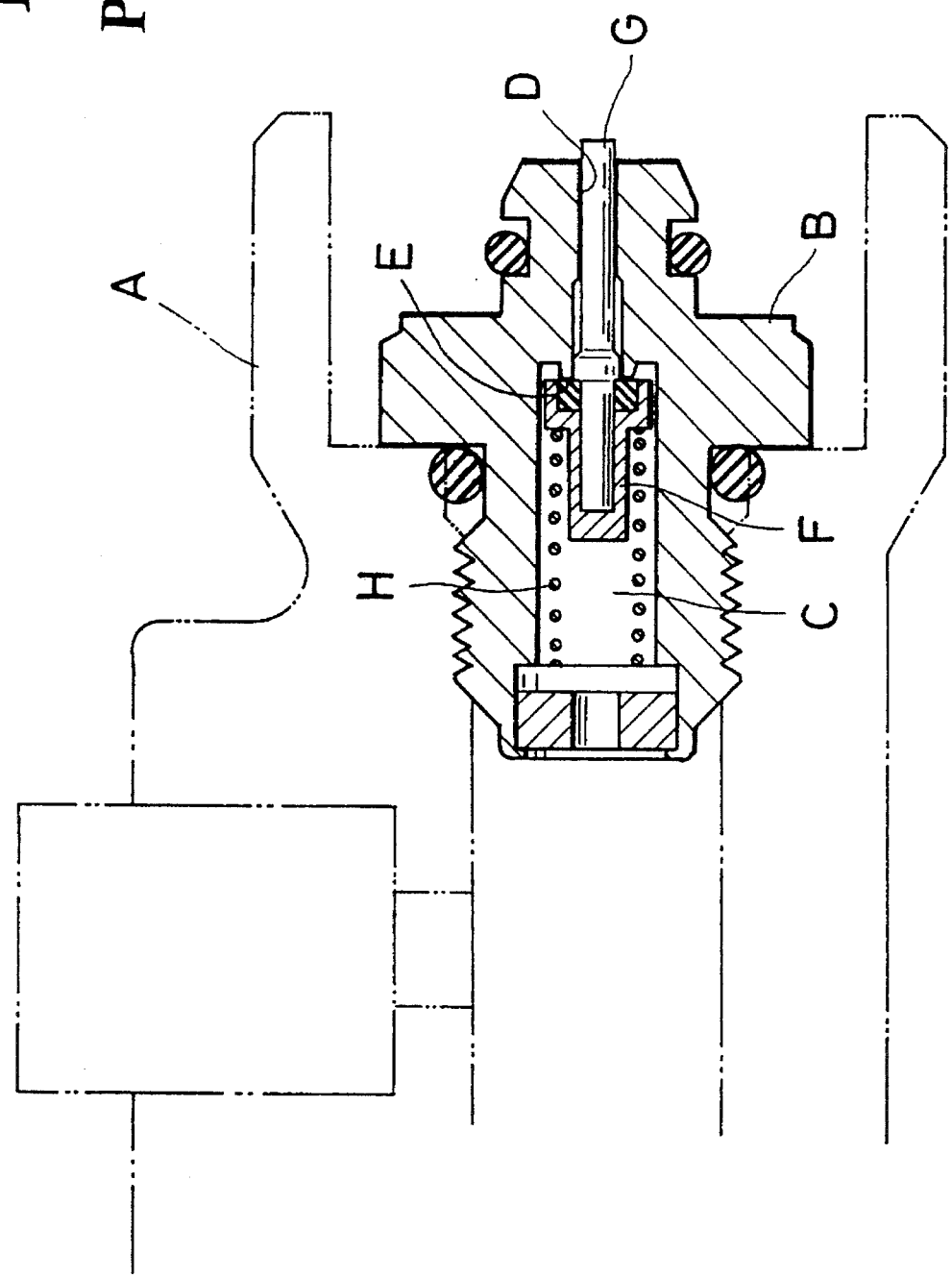
FIG. 17 is an explanatory drawing of a conventional valve arrangement.

In the third preferred embodiment of the invention shown in FIG. 15 and FIG. 16, the main difference from the above first preferred embodiment of the invention is that a nozzle hole 26A having a inside diameter identical throughout the entire length is formed in the valve body 25. In the valve arrangement 19B employing the nozzle hole 26A as constructed above, similar functions and advantages to those in the first preferred embodiment of the invention are obtained.

ADVANTAGES OF THE INVENTION

As is clearly seen from the above explanations, such advantages as listed below are provided:

(1) In a valve arrangement attached to a mouth tap secured to the opening of a pressure vessel, said valve arrangement comprises a valve body which is screwed in and fixed at said mouth tap so as to close the passage of said mouth tap; a passage formed on the valve body composed of a nozzle hole, a main valve operating bore communicating with the nozzle hole and a follower valve operating bore communicating with said main valve operating bore; a main valve mounted to be able to slide within said main valve operating bore, which is capable of opening and closing said nozzle hole but will not close said main valve operating bore; a pressure-exerting spring of the main valve provided within said main valve operating bore and applying force to said main valve in order to close said nozzle hole; a plunger which is integrally formed with said main valve and positioned within said nozzle hole; a fitting metal which is screwed in and attached to said valve body at the end of said follower valve operating bore and which includes a pass hole communicating with said follower valve operating bore; a follower valve mounted to be able to slide within said follower valve operating bore, said follower valve can open and close the passage between said main valve operating bore and said follower valve operating bore and said pass hole, but will not close said follower valve operating bore if either of the above is not closed; a communicating bore formed in the follower valve and communicating with said main valve operating bore and the pass hole of said fitting metal; a check valve which is provided within said communicating bore and permits gas to pass from the pass hole of said fitting metal to said main valve operating bore but prevents it from passing to the pass hole from said main valve operating bore; a pressure-exerting spring of the follower valve provided within said follower valve operating bore and applying force to said follower valve in such direction as the passage between said follower valve operating bore and said main valve operating bore is closed; and a check valve operating rod which is secured to said main valve and releases said follower valve when it is extended towards said follower valve operating bore and the nozzle hole is opened with said plunger pushed in. Thus back-flow at the pressure less than the predetermined value can be prevented by means of the pressure-exerting spring of the main valve and the pressure-exerting spring of the follower valve.

Accordingly, the troubles such as a back-flow of moisture into a pressure vessel causing corrosion of the pressure vessel and reduced durability, and even an accident resulting in explosion as seen in the conventional art can be prevented efficiently.

(2) With the construction in said paragraph (1), the plunger can be pushed in and the follower valve is pressed and opened by the check valve operating rod before compressed gas is charged into the pressure vessel. By so doing, water and the like which has penetrated into the main valve operating bore and the nozzle hole can be blown off by the residual pressure of the pressure vessel. (3) With the construction in said paragraph (1), when charging high pressure gas into the pressure vessel, a larger gap can be used for charging the gas by moving the plunger to an area with a larger diameter of the nozzle hole. This enables the gas to be charged efficienty. In addition, whenever gas flows out in normal state, the plunger will move within an area with a smaller diameter of the nozzle hole to open or close the main valve. This enables the main valve to be opened or closed securely, by which conventional inconveniences caused by wobbling of the valve can be prevented.

What is claimed is:

1. In a valve arrangement to be attached to a mouth tap secured to the opening of a pressure vessel, a valve arrangement characterized in that said valve arrangement comprises: a valve body which is screwed in and fixed at said mouth tap so as to close the passage of said mouth tap; a passage formed on the valve body composed of a nozzle hole, a main valve operating bore communicating with the nozzle hole, and a follower valve operating bore communicating with said main valve operating bore; a main valve mounted to be able to slide within said main valve operating bore, which is capable of opening and closing said nozzle hole but will not close said main valve operating bore; a pressure-exerting spring of the main valve provided within said main valve operating bore and applying force to said main valve in order to close said nozzle hole; a plunger which is integrally formed with said main valve and positioned within said nozzle hole; a fitting metal which is screwed in and attached to said valve body at the end of said follower valve operating bore and which includes a pass hole communicating with said follower valve operating bore; a follower valve mounted to be able to slide within said follower valve operating bore, said follower valve can open and close the passage between said main valve operating bore and said follower valve operating bore and said pass hole, but will not close said follower valve operating bore if either of the above is not closed; a communicating bore formed in the follower valve and communicating with said main valve operating bore and the pass hole of said fitting metal; a check valve which is provided within said communicating bore and permits gas to pass from the pass hole of said fitting metal to said main valve operating bore but prevents it from passing to the pass hole from said main valve operating bore; a pressure-exerting spring of the follower valve provided within said follower valve operating bore and applying force to said follower valve in such a direction as the passage between said follower valve operating bore and said main valve operating bore is closed; and a check valve operating rod which is secured to said main valve and releases said follower valve when it is extended towards said follower valve operating bore and the nozzle hole is opened with said plunger pushed in.

2. The valve arrangemnt according to claim 1, characterized in that said nozzle hole formed on the valve body is provided so that the external end of the hole is smaller in diameter, while the other portion except said end is larger in diameter, and the plunger is arranged so that the end of the plunger will be positioned in the nozzle hole of larger diameter when the main valve has moved to the part where the nozzle hole is opened.

3. The valve arrangemnet according to claim 1, characterized in that the follower valve further comprises: a follower valve body composed of the right and left follower valve components screwed and secured to each other, and an end of said left follower valve component in contact with the follower valve seat of the fitting metal, while an end of the right follower valve component is in contact with the follower valve seat of the follower valve support cylinder; a plurality of gap formed at the outer periphery of the right and left follower valve components of the follower valve body and communicating the pass hole of the fitting metal and the main valve operating bore; a communicating bore of smaller diameter formed at nearly central part of the left follower valve component, and a check valve seat formed at the inner side face of said communicating bore; a check valve inserting bore formed at the central part of the right follower valve component, and communicating with the communicating bore; a small-diameter commuunicating bore communicating with said check valve inserting bore and with the main valve operating bore; an O-ring for sealing which is accommodated in the concave area formed at the end where the right follower valve component contacts the follower valve seat of the follower valve support cylinder; and a check valve body which contacts the check valve seat all the time by the pressure-exerting spring within the check valve inserting bore and will retain the residual pressure within said pressure vessel while closing the said check valve inserting bore.

* * * * *